United States Patent
Wang

(10) Patent No.: US 8,965,109 B2
(45) Date of Patent: Feb. 24, 2015

(54) GAMUT CONTROL METHOD FOR IMPROVING IMAGE PERFORMANCE OF PARALLAX BARRIER S3D DISPLAY

(71) Applicant: Jing Wang, Lund (SE)

(72) Inventor: Jing Wang, Lund (SE)

(73) Assignees: Sony Corporation, Tokyo (JP); Sony Mobile Communications AB, Lund (SE)

(\*) Notice: Subject to any disclaimer, the term of this patent is extended or adjusted under 35 U.S.C. 154(b) by 116 days.

(21) Appl. No.: 13/906,703

(22) Filed: May 31, 2013

(65) Prior Publication Data

US 2014/0037190 A1    Feb. 6, 2014

Related U.S. Application Data

(60) Provisional application No. 61/677,672, filed on Jul. 31, 2012.

(30) Foreign Application Priority Data

Aug. 30, 2012   (EP) .................................... 12182296

(51) Int. Cl.
| | |
|---|---|
| *G06K 9/00* | (2006.01) |
| *G06T 5/00* | (2006.01) |
| *H04N 13/00* | (2006.01) |
| *H04N 13/04* | (2006.01) |

(52) U.S. Cl.
CPC ............ *G06T 5/006* (2013.01); *H04N 13/0018* (2013.01); *H04N 13/0422* (2013.01); *H04N 13/0409* (2013.01); *H04N 2013/0077* (2013.01)
USPC ................ 382/154; 345/419; 356/12; 348/42

(58) Field of Classification Search
USPC ......................... 382/100, 154, 254, 260–275; 345/419–427; 356/12; 348/42
See application file for complete search history.

(56) References Cited

U.S. PATENT DOCUMENTS

| | | | |
|---|---|---|---|
| 6,584,219 B1 * | 6/2003 | Yamashita et al. ............ | 382/154 |
| 8,280,111 B2 * | 10/2012 | Kukshya et al. .............. | 382/103 |
| 8,515,134 B2 * | 8/2013 | Barenbrug et al. ........... | 382/107 |
| 8,873,852 B2 * | 10/2014 | Zhang et al. .................. | 382/173 |
| 2005/0089212 A1 * | 4/2005 | Mashitani et al. ............ | 382/154 |
| 2007/0159476 A1 * | 7/2007 | Grasnick ....................... | 345/419 |
| 2008/0018732 A1 * | 1/2008 | Moller ............................ | 348/51 |
| 2011/0074784 A1 * | 3/2011 | Turner et al. .................. | 345/427 |
| 2012/0038625 A1 * | 2/2012 | Kim ............................... | 345/419 |

\* cited by examiner

*Primary Examiner* — Anand Bhatnagar
(74) *Attorney, Agent, or Firm* — Snyder, Clark, Lesch & Chung, LLP

(57) ABSTRACT

A method for enhancing a three-dimensional (3D) image comprising at least two depth layers wherein each depth layer comprising image objects. The method comprising the steps of determining a near field and a far field comprising at least one depth layer each, identifying the image objects in the near field and the far field respectively, applying a first correction curve to the image objects identified in the near field and applying a second correction curve to the image objects identified in the far field.

12 Claims, 3 Drawing Sheets

GAMUT CONTROL METHOD FOR IMPROVING IMAGE PERFORMANCE OF PARALLAX BARRIER S3D DISPLAY

CROSS-REFERENCE TO RELATED APPLICATIONS

This application claims priority under 35 U.S.C. §119 based on U.S. Provisional Patent Application No. 61/677,672, filed Jul. 31, 2012, and European Patent Application No. 12182296.9, filed Aug. 30, 2012, the disclosures of which are both hereby incorporated by reference herein.

TECHNICAL FIELD

The present invention relates to the field of 3-dimensional images and, in particularly, to the improvement of the image quality of parallax barrier 3-dimensional images.

BACKGROUND

Today, one of the most mature 3-dimensional (3D) display technologies is the parallax barrier technique which is used in a wide range of commercial products like the Nintendo 3DS, HTC Evo 3D, and LG Optimus 3D. However, the parallax barrier technique suffers from a number of drawbacks, such as poor image quality due to low luminance. For example, the luminance of a display employing the parallax barrier technique may be lower than 50% of a comparable 2-dimensional display, which drastically reduces the 3D experience. In order to compensate for the low luminance, the manufacturer increases the backlight of the displays resulting in a larger consumption of power than an ordinary 2-dimensional display. Thus, finding a way to improve the image quality of the parallax barrier technique, and thereby enhancing the 3D experience, is therefore highly sought for.

SUMMARY OF THE INVENTION

With the above description in mind, then, an aspect of the present invention is to provide a way to improve the image quality of a 3D image displayed using the parallax barrier technique which seeks to mitigate, alleviate, or eliminate one or more of the above-identified deficiencies in the art and disadvantages singly or in any combination.

A first aspect of the present invention relates to a method for enhancing a three-dimensional (3D) image comprising at least two depth layers wherein each depth layer comprising image objects, the method comprising the steps; determining a near field and a far field comprising at least one depth layer each, identifying said image objects in said near field and said far field respectively, applying a first gamma correction curve to said image objects identified in said near field, and applying a second gamma correction curve to said image objects identified in said far field.

The method may further comprise assigning first half of the number of depth layers closest to a viewer of the 3D image to the near field and assigning the second half of the number of depth layers furthest away from a viewer of the 3D image to the far field if the number of depth layers is even, and assigning first half minus one of the number of depth layers closest to a viewer of the 3D image to the near field and assigning the second half plus one of the number of depth layers furthest away from a viewer of the 3D image to the far field if the number of depth layers is odd.

The method wherein said identifying of said image objects may be performed using an image object recognition algorithm.

The method wherein the application of the second correction curve generally may reduce the brightness, contrast and color saturation of the objects in the far field, and the application of the first correction curve generally may increase the brightness, color and contrast of the objects in the near field.

The method may further comprise the steps of performing an analysis of the brightness and the color of the 3D image and determining a first and a second correction curve based on said analysis.

The method wherein said 3D image may be a parallax barrier 3D image, and wherein said first and second correction curves may be factory preset and may be based on that said 3D image is a parallax barrier 3D image.

The method wherein said first and second correction curves may be user preset by a user viewing said 3D image.

A second aspect of the present invention relates to a mobile communication device having at least one recording device adapted for recording a three-dimensional (3D) image comprising at least two depth layers, a processor adapted for performing the steps of the method described in the first aspect of the present invention above, and a memory for storing said recorded 3D image and a display for showing said 3D image to a user.

BRIEF DESCRIPTION OF THE DRAWINGS

Further features and advantages of the present invention will appear from the following detailed description of some embodiments and variants of the invention, wherein some embodiments or variants of the invention will be described in more detail with reference to the accompanying drawings, in which.

DETAILED DESCRIPTION

Figure 1:
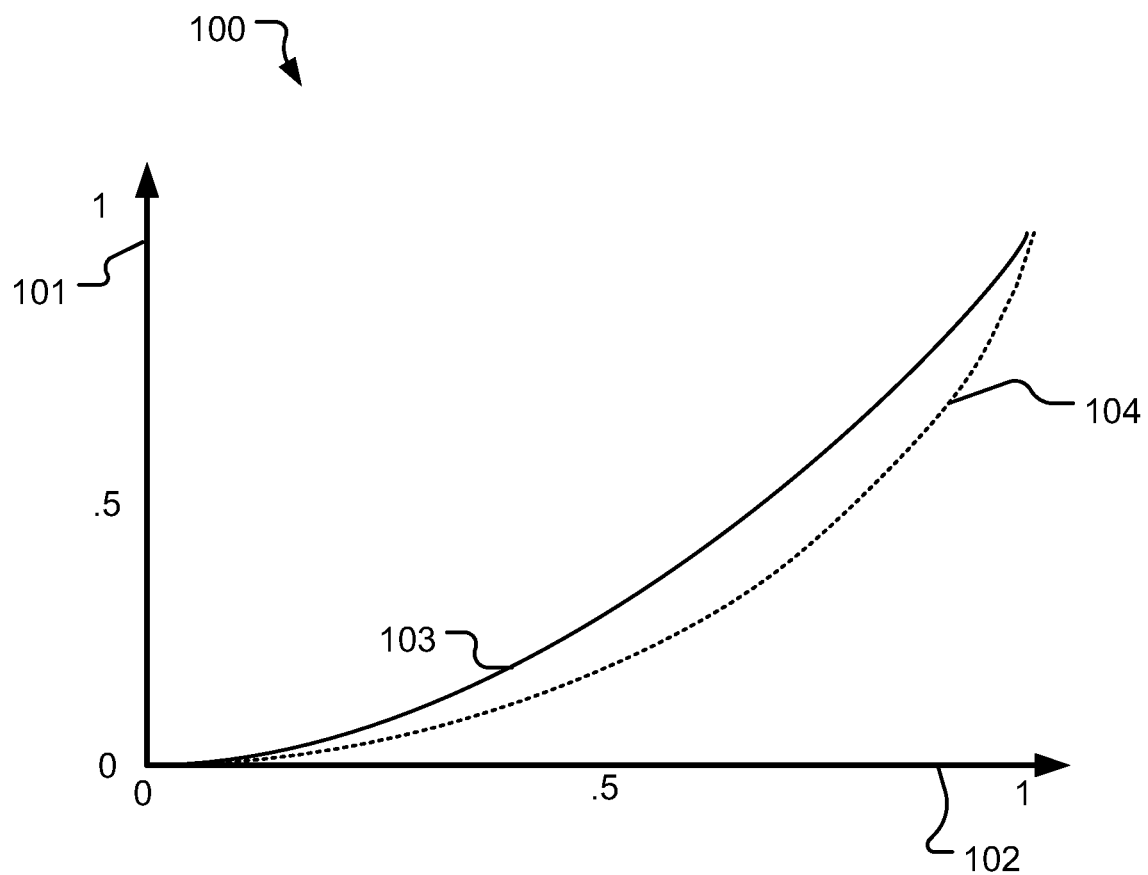
FIG. 1 shows a diagram of the gamma control of the far field image objects, according to an embodiment of the present invention.

Embodiments of the present invention will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The term image is used throughout the text to refer to both moving images (typically movies or videos) and still images (typically photographs). A 3D image is a stereoscopic still image or moving image created to give the illusion of depth in an image. A 3D image may be viewed as being comprised of a number of depth layers, wherein each depth layer defines a segment or a part of the perceived depth in the image or movie. The actual number of depth layers in a 3D image may either be predetermined by the hardware/software recording and coding of the 3D image, the hardware/software involved in the playback of the 3D image, user determined, or it may be a combination of the alternatives. However, any 3D image will have at least two depth layers. Each such depth layer contains one or more image objects. An image object may for instance be a person, a mountain, the sky, a football, or any other type of object visible in the 3D image.

The depth layers may be grouped into different fields, for example a near field and far field. If only two depth layers exist, the depth layer that is perceived to be closest (to the viewer of the 3D image) or in the forefront of the 3D image is defined to belong to the near field, while the depth layer that is perceived to be furthest away (to the viewer of the 3D image) or in the background of the 3D image is defined to belong to the far field. If more than two layers exist in a 3D image, each depth layer is assigned, manually or by an algorithm in hardware or software (or both), to either the near field or the far field. The present invention is not in any way limited to two fields. On the contrary the present invention as will be described below will function with any number of fields containing at least one depth layer each. However, for simplicity the present invention will be described using only two fields, a near field and a far field.

An image object may be confined within one depth layer or it may span or stretch several depth layers. Image objects in a depth layer belonging to the near field is referred to as near field objects while image objects belonging to the far field layer is referred to as far field objects. If an image object spans several fields, for example begins in one depth layer in the near field and continues in another depth layer in the far field, the image object may either be defined to belong in its entirety to one of the fields, often to the field nearest to the viewer of the 3D image which in the case when having only a near field and a far field the object would be defined to belong to the near field, or the object may be "divided" into separated image objects which belongs to several fields (for example both the near field and the far field but treated as two different image objects). The most relevant image objects to the viewer watching the 3D image are often situated in the near field rather than in the far field which often contains background information. For example, in a photograph with a person standing in a grassy field (stretching into the background) with mountains in the background, the person, which in this case is the most interesting object in the 3D image, will be contained in the near field while the mountains in the background will be contained in the far field. The grass in the depth layer(s) in the far field is treated as an image object in the far field and the grass in the depth layer(s) in the near field is treated as an image object in the near field.

One way of improving the quality of 3D images, especially parallax barrier 3D images, and compensating for the low luminance is, according to an embodiment of the present invention, to manipulate the color and the appeared brightness (or the luminance) of the 3D image.

A custom way of adjusting the brightness, or more correctly the luminance, and the appearance of color of a 2D image is to employ so called color gamut control (also known as color gamut mapping). Color gamut control enables the original colors of the 2D image input data to be reproduced and 'fitted' inside a differently shaped color gamut than the color gamut of the original 2D image, and in that way the perspective luminance and the color of the image output data may be optimized in a controlled manner to compensate for, for example, low luminance. The reproduction and re-fitting operation is, to a person skilled in the arts, known as gamma correction. One result of employing such gamma correction is that the image appear brighter and clearer (i.e., richer in contrast) to the viewer. Performing gamma correction of 2D images is a well-known procedure for a person skilled in the art. For instance, in digital display design an image is usually encoded with a gamma of about 0.45 and decoded (meaning shown on a display) with a gamma of 2.2 to compensate for the human vision. This is a well-known technique in the display technology art.

According to the present invention, color gamut control using gamma correction may in a similar way be used to improve the brightness (luminance) and the contrast of a 3D image. The basic idea of the present invention is to apply one gamma correction curve (a first correction curve) to the image objects belonging to the near field, and another gamma correction curve (a second correction curve) to the image objects belonging to the far field, and in that way "enhance" interesting image objects in the foreground and "tone down" image objects of minor interest in the background.

When a 3D image is recorded, using the method for enhancing a three-dimensional (3D) image according to one aspect of the invention, the first step in improving the image quality is to determine how many fields that should be used. This step may be, as discussed above, predetermined by a factory preset or a setting for a software application executing the improvement method, or it may be defined by the user of the 3D recording device, or it may be determined from an analysis of the 3D image. Usually only a far field and a near field are used, however in variants several fields may be determined For simplicity, only two fields, a far field and a near field is used in the following description of the steps in the method.

In the next step it is determined which depth layers belongs to which field. For example, if only two depth layers exist then the depth layer closest to the observer of the 3D image belongs and are associated (or assigned) to the near field and the depth layers furthest away from the observer of the 3D image belongs and are associated (or assigned) to the far field. The step of determining which depth layers that belongs to which field may be omitted as an active determination step. In one variant, with an even number of depth layers in the 3D image, half of the depth layers (i.e. the first half) closest to the viewer of the 3D image are considered to belong (or to be assigned) to the near field and the other half (i.e., the second half) are considered to belong (or to be assigned) to the far field. In another variant, with an odd number of depth layers in the 3D image, half minus one (i.e., the first half minus one) of the depth layers closest to the viewer of the 3D image are considered to belong to the near field and the other half plus one (i.e., the second half plus one) to the far field.

In an image object identification step individual objects in the depth layers in the fields are identified. The identification of image objects in the fields can for instance be done with common image object recognition algorithms, which is a well-known technique in the art.

In a first correction step optimized correction curves are determined, one for the far field and one for the near field. The optimized curves can be factory preset optimized curves depending on the display technology or it could be software determined optimized curves from performing an analysis of the color and brightness (luminance) of the 3D image and/or the objects in the 3D image, or it could be user preset.

In a second correction step, the optimized correction curve 104 for the far field image objects, as shown in FIG. 1, is applied to the depth layers in the far field or in a variant to the depth layers considered belonging to the far field. FIG. 1 shows a diagram illustrating how an optimized correction curve 104 for far field image objects 100 that may be applied to the far field image objects in comparison with an ordinary gamma 2.2 correction curve 103 usually applied in display technology for compensating to the human vision. The x-axis 102 defines the 3D input data and the y-axis 101 defines the 3D display output data. The ordinary gamma 2.2 correction curve 103 is shown together with a suggested optimized correction curve 104 for far field image objects. The suggested optimized correction curve 104 in FIG. 1 shows that the whole band, including both bright input data (0.5-1 on the x-axis) and dark input data, (0-0.5 on the x-axis) is reduced (curve is below the gamma 2.2 curve 103), and thereby reducing the brightness of the image objects in the background of the 3D image (in the far field). This will reduce the overall power consumption, especially since these objects usually take up a larger part of the image.

Figure 2:
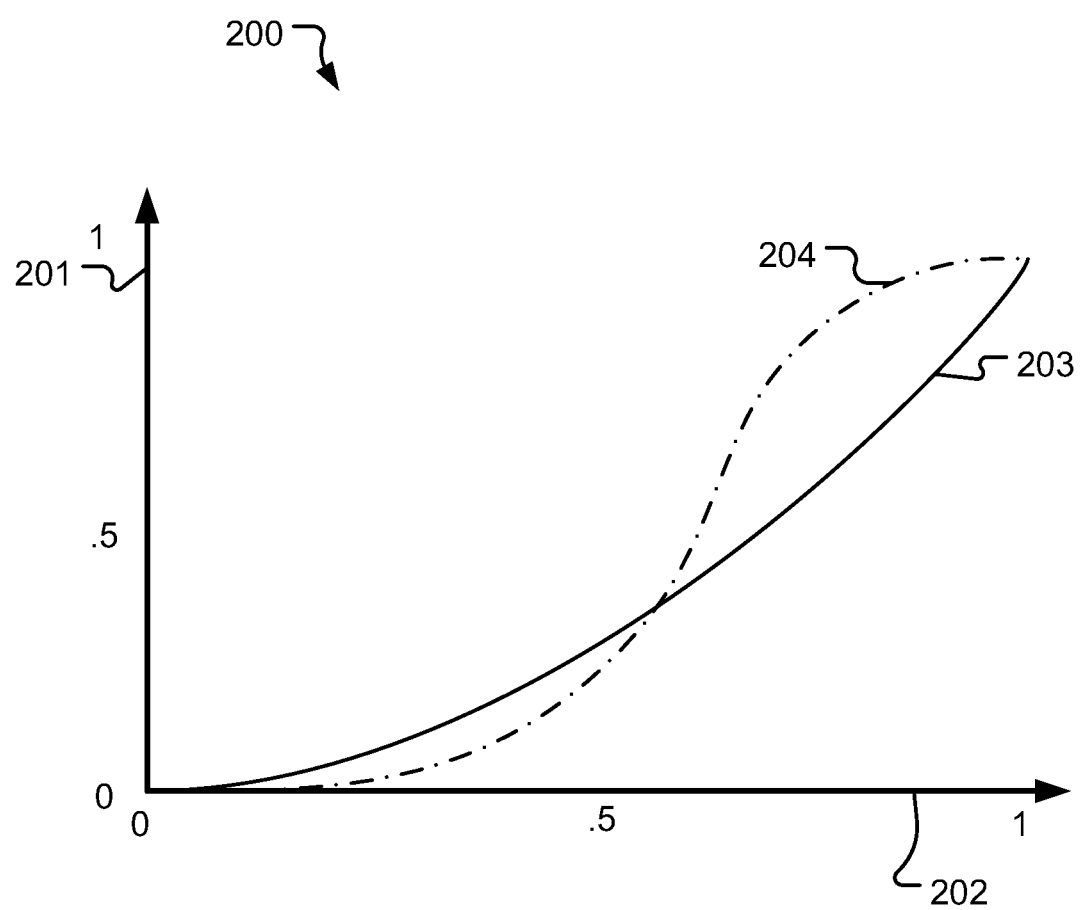
FIG. 2 shows a diagram of the gamma control of the near field image objects, according to an embodiment of the present invention.

In a third correction step, the optimized correction curve 204 for the near field image objects 200, as shown in FIG. 2, is applied to the depth layers in the near field or in a variant to the depth layers considered belonging to the near field. FIG. 2 shows a diagram illustrating an example of an optimized correction curve 204 for near field image objects 200 that may be applied to the near field image objects in comparison with an ordinary gamma 2.2 correction curve 203 usually applied in display technology for compensating for the human vision. The x-axis 202 defines the 3D input data and the y-axis 201 defines the 3D display output data. The ordinary gamma 2.2 correction curve 203 is shown together with a suggested optimized correction curve 204 for far field image objects. The suggested optimized correction curve 204 in FIG. 2 is in contrast to the suggested optimized correction curve 104 in FIG. 1 'S'-shaped. This means that lower gain is applied to darker 3D image input data, shown by that the first part of the suggested optimized correction curve 204 (between 0-around 0.5) is below the gamma 2.2 correction curve 203 in the same interval, and that a higher gain is applied to lighter 3D image input data, shown by that the first part of the suggested optimized correction curve 204 (between around 0.5-1) is above the gamma 2.2 correction curve 203 in the same interval. The effect of this is that the near field image objects will be increased in brightness and in contrast. This effect will further be amplified by the effect of darkening the image objects in the far field coming from applying the suggested optimized correction curve 104 in FIG. 1. Special care must be taken when determining the 'S'-shaped optimized correction curve 204 so that the image will not appear too artificial in appearance.

Thus, by applying the method above, a way to improve the image quality of the parallax barrier technique, and thereby enhancing the 3D experience, is achieved with the added bonus of reducing the overall power consumption.

Figure 3:
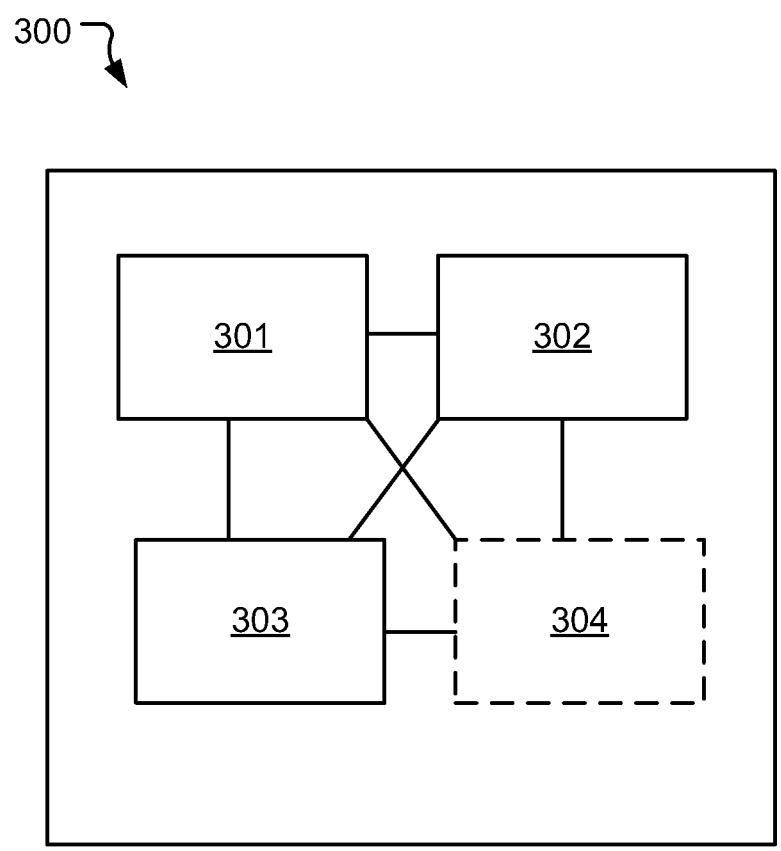
FIG. 3 shows a block diagram of a mobile communication device employing the present invention.

The method according to the present invention as presented above can be implemented in not only devices using parallax bather technique, but also in other 3D display techniques. Devices, such as mobile communication device 300 illustrated by the block diagram in FIG. 3, using the method presented above may be implement by using a processor 301, for performing the calculations of the correction curves illustrated in FIGS. 1 and 2 and for determining layers and fields, a memory for storing captured and processed 3D image data, a recording device 302 (such as a 3D camera unit) for recording 3D images, a display for displaying 3D images 303 and optionally one or more (illustrated by the dotted lines) processing means 304 for aiding the processor in calculations.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The foregoing has described the principles, preferred embodiments and modes of operation of the present invention. However, the invention should be regarded as illustrative rather than restrictive, and not as being limited to the particular embodiments discussed above. The different features of the various embodiments of the invention can be combined in other combinations than those explicitly described.

The invention claimed is:

1. A method for enhancing a three-dimensional (3D) image comprising at least two depth layers, wherein each depth layer comprises image objects, the method comprising:
   determining a near field and a far field comprising at least one depth layer each;
   identifying said image objects in said near field and said far field respectively;
   applying a first correction curve to said image objects identified in said near field; and
   applying a second correction curve to said image objects identified in said far field.

2. The method according to claim 1, further comprising:
   assigning first half of the number of depth layers closest to a viewer of the 3D image to the near field and assigning the second half of the number of depth layers furthest away from a viewer of the 3D image to the far field if the number of depth layers is even; and
   assigning first half minus one of the number of depth layers closest to a viewer of the 3D image to the near field and assigning the second half plus one of the number of depth layers furthest away from a viewer of the 3D image to the far field if the number of depth layers is odd.

3. The method according to claim 1, wherein said identifying of said image objects is performed using an image object recognition algorithm.

4. The method according to claim 1, wherein the application of the second correction curve generally reduce the brightness, contrast and color of the objects in the far field.

5. The method according to claim 4, further comprising:
   performing an analysis of the brightness and the color of the 3D image; and
   determining a first and a second correction curve based on said analysis.

6. The method according to claim 4, wherein said 3D image is a parallax barrier 3D image, and wherein said first and second correction curves are factory preset and are based on that said 3D image is a parallax barrier 3D image.

7. The method according to claim 4, wherein said first and second correction curves are user preset by a user viewing said 3D image.

8. The method according to claim 1, wherein the application of the first correction curve generally increase the brightness, color and contrast of the objects in the near field.

9. The method according to claim 8, further comprising:
   performing an analysis of the brightness and the color of the 3D image; and determining a first and a second correction curve based on said analysis.

10. The method according to claim 8, wherein said 3D image is a parallax barrier 3D image, and wherein said first and second correction curves are factory preset and are based on that said 3D image is a parallax barrier 3D image.

11. The method according to claim 8, wherein said first and second correction curves are user preset by a user viewing said 3D image.

12. A mobile communication device having at least one recording device adapted for recording a three-dimensional (3D) image comprising at least two depth layers, a processor adapted for performing the method of claim 1, and a memory for storing said recorded 3D image and a display for showing said 3D image to a user.

* * * * *